(12) United States Patent
Xin et al.

(10) Patent No.: US 9,237,038 B2
(45) Date of Patent: Jan. 12, 2016

(54) CHANNEL AND NOISE ESTIMATION METHOD AND ASSOCIATED APPARATUS

(71) Applicant: MStar Semiconductor, Inc., Hsinchu Hsien (TW)

(72) Inventors: Kai Xin, Hsinchu County (TW); Xuan-Cheng Zhu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 168 days.

(21) Appl. No.: 13/950,582

(22) Filed: Jul. 25, 2013

(65) Prior Publication Data

US 2014/0029460 A1    Jan. 30, 2014

(30) Foreign Application Priority Data

Jul. 27, 2012  (CN) .......................... 2012 2 0370190

(51) Int. Cl.
*H04B 1/10* (2006.01)
*H04L 25/02* (2006.01)
*H04W 24/02* (2009.01)

(52) U.S. Cl.
CPC ........ *H04L 25/0244* (2013.01); *H04L 25/0204* (2013.01); *H04W 24/02* (2013.01)

(58) Field of Classification Search
None
See application file for complete search history.

(56) References Cited

U.S. PATENT DOCUMENTS

| 2006/0280257 | A1* | 12/2006 | Kim | .............................. 375/267 |
| 2007/0127588 | A1* | 6/2007 | Kim | .............................. 375/267 |
| 2008/0226001 | A1* | 9/2008 | Geng et al. | .................... 375/350 |

FOREIGN PATENT DOCUMENTS

TW          200713894          4/2007

* cited by examiner

*Primary Examiner* — Gregory Sefcheck
*Assistant Examiner* — Jenkey Van
(74) *Attorney, Agent, or Firm* — WPAT, PC; Justin King; Douglas Hosack

(57) ABSTRACT

A channel and noise estimation method includes: performing channel estimation on a received signal to obtain a real channel estimation value; filtering the real channel estimation value to obtain a filtered channel estimation value; calculating a biased noise power value, a biased signal power value, a biased noise correlation and a biased signal correlation according to the filtered channel estimation value; calculating an unbiased noise power value, an unbiased signal power value, an unbiased noise correlation and an unbiased signal correlation according to the biased noise power value, the biased signal power value, the biased noise correlation and the biased signal correlation.

5 Claims, 4 Drawing Sheets

CHANNEL AND NOISE ESTIMATION METHOD AND ASSOCIATED APPARATUS

BACKGROUND OF THE INVENTION

1. Field of the Invention

The invention relates in general to wireless communications, and more particularly to a channel and noise estimation method and associated apparatus.

2. Description of the Related Art

In a long-term evolution (LTE) wireless communication system, a signal-to-noise ratio (SNR) is a critical index for measuring reception performance of the communication system. The SNR can be affected by estimation values including a signal power and a noise power. Further, the accuracy in estimation values including a signal power, a noise power, a signal correlation and a noise correlation have direct influences on a demodulation result of signals demodulated by a subsequent demodulation module in the communication system.

It is discovered by the Applicant during long-term researches that, in current technologies, a conventional estimation method for a signal power and a noise power in a wireless communication system frequently causes issues of an unsatisfactory accuracy and complex technicalities. Moreover, a conventional estimation method does not provide estimation values for correlations of signals and noises of different reception antennas.

SUMMARY OF THE INVENTION

The invention is directed to a channel and noise estimation method and associated apparatus capable of reducing signal and noise estimation complexities as well as enhancing an estimation accuracy.

According to an aspect of the present invention, a channel and noise estimation method is provided. The method includes steps of: performing channel estimation on a received signal to obtain a real channel estimation value; filtering the real channel estimation value to obtain a filtered channel estimation value; calculating a biased noise power value, a biased signal power value, a biased noise correlation and a biased signal correlation according to the filtered channel estimation value; and calculating an unbiased noise power value, an unbiased signal power value, an unbiased noise correlation and an unbiased signal correlation according to the biased noise power value, the biased signal power value, the biased noise correlation and the biased signal correlation.

The step of performing the channel estimation on the received signal to obtain the real channel estimation value includes: performing the channel estimation on at least one signal received by a first reception antenna and a second reception antenna, respectively, to obtain corresponding real channel estimation values $H_{LS}^1$ and $H_{LS}^2$. Wherein, $H_{LS}^1$ represents the real channel estimation value corresponding to the first reception antenna, and $H_{LS}^2$ represents the real channel estimation value corresponding to the second reception antenna.

The step of filtering the real channel estimation value to obtain the filtered channel estimation value includes: filtering the real channel estimation values $H_{LS}^1$ and $H_{LS}^2$ by utilizing a first filter and a second filter, respectively, to obtain corresponding filtered channel estimation values $Y_w^1(k)$, $Y_w^2(k)$, $Y_u^1(k)$ and $Y_u^2(k)$. Wherein, $Y_w^1(k)$ represents the filtered channel estimation value obtained from filtering $H_{LS}^1$ by the first filter, $Y_w^2(k)$ represents the filtered channel estimation value obtained from filtering $H_{LS}^2$ by the first filter, $Y_u^1(k)$ represents the filtered channel estimation value obtained from filtering $H_{LS}^1$ by the second filter, and $Y_u^2(k)$ represents the filtered channel estimation value obtained from filtering $H_{LS}^2$ by the second filter.

Values of $H_{LS}^1$ and $H_{LS}^2$ are:

$$H_{LS}^1 = H_{ideal}^1 + v^1 \qquad (1)$$

$$H_{LS}^2 = H_{ideal}^2 + v^2 \qquad (2)$$

In the above equations, $H_{ideal}^1$ represents an ideal channel estimation value of the first reception antenna, $v^1$ represents a noise value of the first reception antenna, $H_{ideal}^2$ represents an ideal channel estimation value of the second reception antenna, and $v^2$ represents a noise value of the second reception antenna.

$Y_w^1(k)$, $Y_w^2(k)$, $Y_u^1(k)$ and $Y_u^2(k)$ are calculated through the following equations:

$$Y_w^1(k) = wH_{LS}^1 \qquad (3)$$

$$Y_w^2(k) = wH_{LS}^2 \qquad (4)$$

$$Y_u^1(k) = uH_{LS}^1 \qquad (5)$$

$$Y_u^2(k) = uH_{LS}^2 \qquad (6)$$

In the above equations, w represents a coefficient row vector of the first filter, k represents a $k^{th}$ subcarrier on a frequency domain, and u represents a coefficient row vector of the second filter. The first and second filters are linearity-unassociated.

The step of calculating the biased noise power value, the biased signal power value, the biased noise correlation and the biased signal correlation according to the filtered channel estimation value includes: calculating biased noise power values $S_w^1$ and $S_w^2$, biased signal power values $S_u^1$ and $S_u^2$, a biased noise correlation $P_w^{12}$ between $Y_w^1(k)$ and $Y_w^2(k)$, and a biased signal correlation $P_u^{12}$ between $Y_u^1(k)$ and $Y_u^2(k)$ corresponding to the first reception antenna and the second reception of $S_w^1$, $S_w^2$, $S_u^1$, $S_u^2$, $P_w^{12}$ and $P_u^{12}$ are calculated through the equations below:

$$S_w^1 = E_k(Y_w^1(k) \cdot Y_w^1(k)^*) \qquad (7)$$

$$S_w^2 = E_k(Y_w^2(k) \cdot Y_w^2(k)^*) \qquad (8)$$

$$S_u^1 = E_k(Y_u^1(k) \cdot Y_u^1(k)^*) \qquad (9)$$

$$S_u^2 = E_k(Y_u^2(k) \cdot Y_u^2(k)^*) \qquad (10)$$

$$P_w^{12} = E_k(Y_w^1(k) \cdot Y_w^2(k)^*) \qquad (11)$$

$$P_u^{12} = E_k(Y_u^1(k) \cdot Y_u^2(k)^*) \qquad (12)$$

In the above equations, $S_w^1$ represents the biased noise power value corresponding to the first reception antenna, $S_w^2$ represents the biased noise power value corresponding to the second reception antenna, $S_u^1$ represents the biased signal power value corresponding to the first reception antenna, $S_u^2$ represents the biased signal power value corresponding to the second reception antenna, $P_w^{12}$ represents the biased noise correlation between $Y_w^1(k)$ and $Y_w^2(k)$, $P_u^{12}$ represents the biased signal correlation between $Y_u^1(k)$ and $Y_u^2(k)$, $E_k(\bullet)$ represents a frequency-domain average, and $(\bullet)^*$ represents a conjugation.

The step of calculating the unbiased noise power value, the unbiased signal power value, the unbiased noise correlation and the unbiased signal correlation according to the biased noise power value, the biased signal power value, the biased noise correlation and the biased signal correlation includes the following steps.

It is obtained from equations (1), (3) and (7) that:

$$S_w^1 = E_k(Y_w^1(k) \cdot Y_w^1(k)^*) = wE[(H_{ideal}^1 + v^1)(H_{ideal}^1 + v^1)^H]w^H \quad (13)$$
$$= w(\alpha_1^2 R_{HH} + \sigma_1^2 I)w^H = \alpha_1^2 w R_{HH} w^H + \sigma_1^2 w w^H$$

It is obtained from equations (1), (5) and (9) that:

$$S_u^1 = E_k(Y_u^1(k) \cdot Y_u^1(k)^*) = uE[(H_{ideal}^1 + v^1)(H_{ideal}^1 + v^1)^H]u^H \quad (14)$$
$$= u(\alpha_1^2 R_{HH} + \sigma_1^2 I)u^H = \alpha_1^2 u R_{HH} u^H + \sigma_1^2 u u^H$$

By establishing a simultaneous equation from equations (13) and (14), it is obtained that:

$$\begin{pmatrix} S_w^1 \\ S_u^1 \end{pmatrix} = \begin{pmatrix} wR_{HH}w^H & ww^H \\ uR_{HH}u^H & uu^H \end{pmatrix} \begin{pmatrix} \alpha_1^2 \\ \sigma_1^2 \end{pmatrix} \quad (15)$$

By inverting the $$\begin{pmatrix} wR_{HH}w^H & ww^H \\ uR_{HH}u^H & uu^H \end{pmatrix}$$

matrix in equation (15), according to the biased noise power value $S_w^1$ corresponding to the first reception antenna and the biased signal power value $S_u^1$ corresponding to the first reception antenna, it is obtained that:

$$\begin{pmatrix} \alpha_1^2 \\ \sigma_1^2 \end{pmatrix} = \begin{pmatrix} wR_{HH}w^H & ww^H \\ uR_{HH}u^H & uu^H \end{pmatrix}^{-1} \begin{pmatrix} S_w^1 \\ S_u^1 \end{pmatrix} \quad (16)$$

In the above equations, $E(\bullet)$ represents an average, $(\bullet)^H$ represents a conjugate transpose, I represents a unit matrix, $R_{HH}$ represents a correlation matrix of $H_{LS}^1$ and $H_{LS}^2$ on the subcarriers, $\alpha_1^2$ represents the unbiased signal power value corresponding to the first reception antenna, and $\sigma_1^2$ represents the unbiased noise power value corresponding to the first reception antenna.

Similarly, an unbiased signal power value $\alpha_2^2$ corresponding to the second reception antenna and an unbiased noise power value $\sigma_2^2$ corresponding to the second reception antenna can be obtained.

According to equations (1), (2), (3), (4) and (11), it is obtained that:

$$P_w^{12} = E_k(Y_w^1(k) \cdot Y_w^2(k)^*) = wE[(H_{ideal}^1 + v^1)(H_{ideal}^2 + v^2)^H]w^H \quad (17)$$
$$= w(\beta_{12} R_{HH} + \gamma_{12} I)w^H = \beta_{12} w R_{HH} w^H + \gamma_{12} w w^H$$

According to equations (1), (2), (5), (6) and (12), it is obtained that:

$$P_u^{12} = E_k(Y_u^1(k) \cdot Y_u^2(k)^*) = uE[(H_{ideal}^1 + v^1)(H_{ideal}^2 + v^2)^H]u^H \quad (18)$$

-continued
$$= u(\beta_{12} R_{HH} + \gamma_{12} I)u^H = \beta_{12} u R_{HH} u^H + \gamma_{12} u u^H$$

By establishing a simultaneous equation from equations (17) and (18), it is obtained that:

$$\begin{pmatrix} P_w^{12} \\ P_u^{12} \end{pmatrix} = \begin{pmatrix} wR_{HH}w^H & ww^H \\ uR_{HH}u^H & uu^H \end{pmatrix} \begin{pmatrix} \beta_{12} \\ \gamma_{12} \end{pmatrix} \quad (19)$$

By inverting the matrix in equation (19), according to the biased noise correlation $P_w^{12}$ and the biased signal correlation $P_w^{12}$, it is obtained that:

$$\begin{pmatrix} \beta_{12} \\ \gamma_{12} \end{pmatrix} = \begin{pmatrix} wR_{HH}w^H & ww^H \\ uR_{HH}u^H & uu^H \end{pmatrix}^{-1} \begin{pmatrix} P_w^{12} \\ P_u^{12} \end{pmatrix} \quad (20)$$

In the above equations, $\beta_{12}$ represents the unbiased signal correlation between $Y_u^1(k)$ and $Y_u^2(k)$, and $\beta_{12}$ represents the unbiased noise correlation between $Y_w^1(k)$ and $Y_w^2(k)$.

After the step of calculating the unbiased noise power value, the unbiased signal power value, the unbiased noise correlation and the unbiased signal correlation according to the biased noise power value, the biased signal power value, the biased noise correlation and the biased signal correlation, the method further includes: frequency-domain smoothing the unbiased noise power value, the unbiased signal power value, the unbiased noise correlation and the unbiased signal correlation; time-domain filtering the frequency-domain smoothed unbiased noise power value, unbiased signal power value, unbiased noise correlation and unbiased signal correlation; and demodulating the filtered unbiased noise power value, unbiased signal power value, unbiased noise correlation and unbiased signal correlation.

According to another aspect of the present invention, a channel and noise estimation apparatus is provided. The apparatus includes: channel estimation module, for performing channel estimation on a received signal to obtain a real channel estimation value; a first filter module and a second filter module, for filtering the real channel estimation value to obtain a filtered channel estimation value, respectively; a first calculation module, for calculating a biased noise power value, a biased signal power value, a biased noise correlation and a biased signal correlation according to the filtered channel estimation values; a second calculation module, for calculating an unbiased noise power value, an unbiased signal power value, an unbiased noise correlation and an unbiased signal correlation according to the biased noise power value, the biased signal power value, the biased noise correlation and the biased signal correlation.

More specifically, the channel estimation module performs the channel estimation on at least one signal received by a first reception antenna and a second reception antenna, respectively, to obtain corresponding real channel estimation values $H_{LS}^1$ and $H_{LS}^2$. Wherein, $H_{LS}^1$ represents the real channel estimation value corresponding to the first reception antenna and $H_{LS}^2$ represents the real channel estimation value corresponding to the second reception antenna.

More specifically, the first and second filter modules respectively filter the real channel estimation values $H_{LS}^1$ and $H_{LS}^2$ to obtain corresponding filtered channel estimation values $Y_w^1(k)$, $Y_w^2(k)$ $Y_u^1(k)$ and $Y_u^2(k)$. Wherein, $Y_w^1(k)$ represents the filtered channel estimation value obtained from filtering $H_{LS}^1$ by the first filter module, $Y_w^2(k)$ represents the filtered channel estimation value obtained from filtering $H_{LS}^2$ filtered by the first filter module, $Y_u^1(k)$ represents the filtered channel estimation value obtained from filter $H_{LS}^1$ filtered by the second filter module, and $Y_u^2(k)$ represents the filtered channel estimation value obtained from filtering $H_{LS}^2$ filtered by the second filter module.

Values of $H_{LS}^1$ and $H_{LS}^2$ are:

$$H_{LS}^1 = H_{ideal}^1 + v^1 \quad (1)$$

$$H_{LS}^2 = H_{ideal}^2 + v^2 \quad (2)$$

In the above equations, $H_{ideal}^1$ represents an ideal channel estimation value of the first reception antenna, $v^1$ represents a noise value of the first reception antenna, $H_{ideal}^2$ represents an ideal channel estimation value of the second reception antenna, and $v^2$ represents a noise value of the second reception antenna.

Values of $Y_w^1(k)$, $Y_w^2(k)$, $Y_u^1(k)$ and $Y_u^2(k)$ are calculated through the following equations:

$$Y_w^1(k) = w H_{LS}^1 \quad (3)$$

$$Y_w^2(k) = w H_{LS}^2 \quad (4)$$

$$Y_u^1(k) = u H_{LS}^1 \quad (5)$$

$$Y_u^2(k) = u H_{LS}^2 \quad (6)$$

In the above equations, w represents a coefficient row vector of the first filter module, k represents a $k^{th}$ subcarrier on a frequency domain, and u represents a coefficient row vector of the second filter module.

More specifically, the first calculation module calculates biased noise power values $S_w^1$ and $S_w^2$, biased signal power values $S_u^1$ and $S_u^2$, a biased noise correlation $P_w^{12}$ between $Y_w^1(k)$ and $Y_w^2(k)$, and a biased signal correlation $P_u^{12}$ between $Y_u^1(k)$ and $Y_u^2(k)$ corresponding to the first reception antenna and the second reception antenna according to $Y_w^1(k)$, $Y_w^2(k)$, $Y_u^1(k)$, $Y_u^2(k)$, respectively. Values of $S_w^1$, $S_w^2$, $S_u^1$, $S_u^2$, $P_w^{12}$ and $P_u^{12}$ are calculated through the equations below:

$$S_w^1 = E_k(Y_w^1(k) \cdot Y_w^1(k)^*) \quad (7)$$

$$S_w^2 = E_k(Y_w^2(k) \cdot Y_w^2(k)^*) \quad (8)$$

$$S_u^1 = E_k(Y_u^1(k) \cdot Y_u^1(k)^*) \quad (9)$$

$$S_u^2 = E_k(Y_u^2(k) \cdot Y_u^2(k)^*) \quad (10)$$

$$P_w^{12} = E_k(Y_w^1(k) \cdot Y_w^2(k)^*) \quad (11)$$

$$P_u^{12} = E_k(Y_u^1(k) \cdot Y_u^2(k)^*) \quad (12)$$

In the above equations, $S_w^1$ represents the biased noise power value corresponding to the first reception antenna, $S_w^2$ represents the biased noise power value corresponding to the second reception antenna, $S_u^1$ represents the biased signal power value corresponding to the first reception antenna, $S_u^2$ represents the biased signal power value corresponding to the second reception antenna, $P_w^{12}$ represents the biased noise correlation, $P_u^{12}$ represents the biased signal correlation, $E_k(\bullet)$ represents a frequency-domain average, and $(\bullet)^*$ represents a conjugation.

More specifically, according to equations (1), (3) and (7), the second calculation module obtains that:

$$S_w^1 = E_k(Y_w^1(k) \cdot Y_w^1(k)^*) = wE[(H_{ideal}^1 + v^1)(H_{ideal}^1 + v^1)^H]w^H \quad (13)$$

$$= w(\alpha_1^2 R_{HH} + \sigma_1^2 I)w^H = \alpha_1^2 w R_{HH} w^H + \sigma_1^2 w w^H$$

More specifically, according to equations (1), (5) and (9), the second calculation module obtains that:

$$S_u^1 = E_k(Y_u^1(k) \cdot Y_u^1(k)^*) = uE[(H_{ideal}^1 + v^1)(H_{ideal}^1 + v^1)^H]u^H \quad (14)$$

$$= u(\alpha_1^2 R_{HH} + \sigma_1^2 I)u^H = \alpha_1^2 u R_{HH} u^H + \sigma_1^2 u u^H$$

By establishing a simultaneous equation from equations (13) and (14), the second calculation module obtains that:

$$\begin{pmatrix} S_w^1 \\ S_u^1 \end{pmatrix} = \begin{pmatrix} w R_{HH} w^H & w w^H \\ u R_{HH} u^H & u u^H \end{pmatrix} \begin{pmatrix} \alpha_1^2 \\ \sigma_1^2 \end{pmatrix} \quad (15)$$

By inverting the matrix $$\begin{pmatrix} w R_{HH} w^H & w w^H \\ u R_{HH} u^H & u u^H \end{pmatrix}$$

in equation (15), according to the biased noise power value $S_w^1$ corresponding to the first reception antenna and the biased signal power value $S_u^1$ corresponding to the first reception antenna, the second calculation module obtains that:

$$\begin{pmatrix} \alpha_1^2 \\ \sigma_1^2 \end{pmatrix} = \begin{pmatrix} w R_{HH} w^H & w w^H \\ u R_{HH} u^H & u u^H \end{pmatrix}^{-1} \begin{pmatrix} S_w^1 \\ S_u^1 \end{pmatrix} \quad (16)$$

In the above equation, $E(\bullet)$ represents an average, $(\bullet)^H$ represents a conjugate transpose, I represents a unit matrix, $R_{HH}$ represents a correlation matrix of $H_{LS}^1$ and $H_{LS}^2$ on the subcarriers, $\alpha_1^2$ represents the unbiased signal power value corresponding to the first reception antenna, and $\sigma_1^2$ represents the unbiased noise power value corresponding to the first reception antenna.

Similarly, the second calculation module obtains an unbiased signal power value $\alpha_2^2$ corresponding to the second reception antenna and an unbiased noise power value $\sigma_2^2$ corresponding to the second reception antenna.

More specifically, according to equations (1), (2), (3), (4) and (11), the second calculation module obtains that:

$$P_w^{12} = E_k(Y_w^1(k) \cdot Y_w^2(k)^*) = wE[(H_{ideal}^1 + v^1)(H_{ideal}^2 + v^2)^H]w^H \quad (17)$$

$$= w(\beta_{12} R_{HH} + \gamma_{12} I)w^H = \beta_{12} w R_{HH} w^H + \gamma_{12} w w^H$$

More specifically, according to equations (1), (2), (5), (6) and (12), the second calculation module obtains that:

$$P_u^{12} = E_k(Y_u^1(k) \cdot Y_u^2(k)^*) = uE[(H_{ideal}^1 + v^1)(H_{ideal}^2 + v^2)^H]u^H \quad (18)$$
$$= u(\beta_{12}R_{HH} + \gamma_{12}I)u^H = \beta_{12}uR_{HH}u^H + \gamma_{12}uu^H$$

By establishing a simultaneous equation from equations (17) and (18), the second calculation module obtains that:

$$\begin{pmatrix} P_w^{12} \\ P_u^{12} \end{pmatrix} = \begin{pmatrix} wR_{HH}w^H & ww^H \\ uR_{HH}u^H & uu^H \end{pmatrix} \begin{pmatrix} \beta_{12} \\ \gamma_{12} \end{pmatrix} \quad (19)$$

More specifically, by inverting the matrix $$\begin{pmatrix} wR_{HH}w^H & ww^H \\ uR_{HH}u^H & uu^H \end{pmatrix}$$

in equation (19), according to the biased noise correlation $P_w^{12}$ and the biased signal correlation $P_u^{12}$, the second calculation module obtains that:

$$\begin{pmatrix} \beta_{12} \\ \gamma_{12} \end{pmatrix} = \begin{pmatrix} wR_{HH}w^H & ww^H \\ uR_{HH}u^H & uu^H \end{pmatrix}^{-1} \begin{pmatrix} P_w^{12} \\ P_u^{12} \end{pmatrix} \quad (20)$$

In the above equation, $\beta_{12}$ represents the unbiased signal correlation between $Y_u^1(k)$ and $Y_u^2(k)$, and $\beta_{12}$ represents the unbiased noise correlation between $Y_w^1(k)$ and $Y_w^2(k)$.

The channel and noise estimation apparatus further includes: a frequency-domain smoothing module, for frequency-domain smoothing the unbiased noise power value, the unbiased signal power value, the unbiased noise correlation and the unbiased signal correlation; a time-domain filter module, for filtering the frequency-domain smoothed unbiased noise power value, unbiased signal power value, unbiased noise correlation and unbiased signal correlation; and a demodulation module, for demodulating the filtered unbiased noise power value, unbiased signal power value, unbiased noise correlation and unbiased signal correlation.

In the channel and noise estimation method and associated apparatus disclosed by the present invention, channel estimation is performed on a received signal to obtain a real channel estimation value, which is filtered to obtain a filtered channel estimation value. According to the filtered channel estimation value, a biased noise power value, a biased signal power value, a biased noise correlation and a biased signal correlation are calculated. According to the biased noise power value, the biased signal power value, the biased noise correlation and the biased signal correlation obtained, an unbiased noise power value, an unbiased signal power value, an unbiased noise correlation and a biased signal correlation are calculated. As such, signal and noise estimation complexities can be reduced while also enhancing an estimation accuracy.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
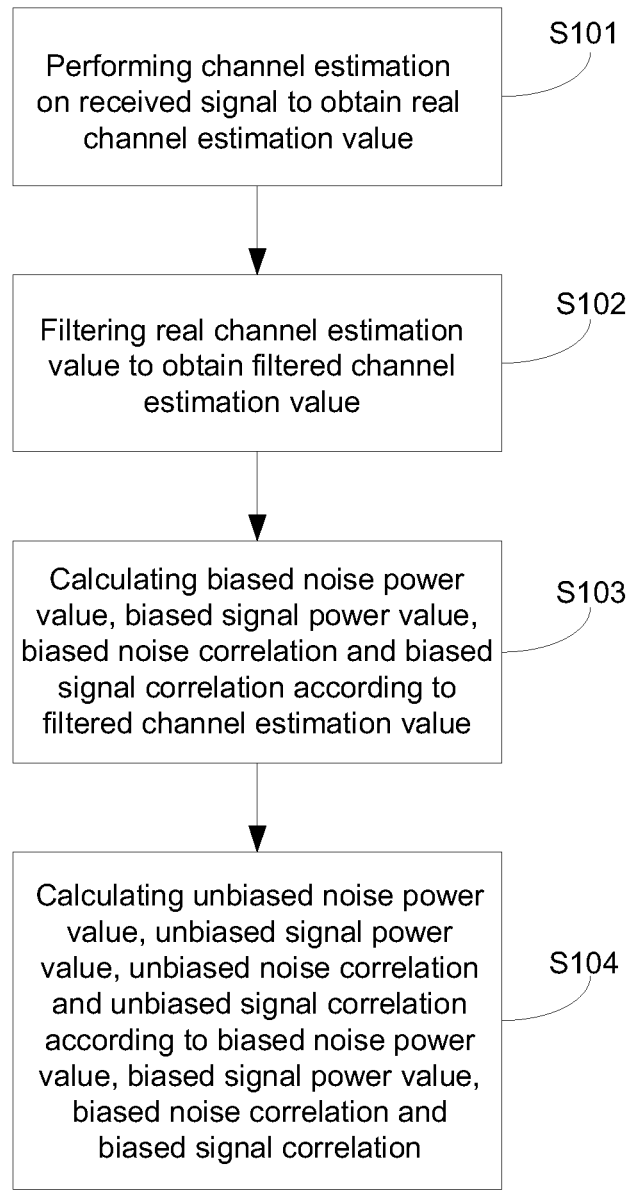
FIG. 1 is a flowchart of a channel and noise estimation method according to a first embodiment of the present invention.

FIG. 1 shows a flowchart of a channel and noise estimation method according to a first embodiment of the present invention. The method includes the following steps.

In step S101, channel estimation is performed on a received signal to obtain a real channel estimation value.

More specifically, step S101 of performing channel estimation on a received signal to obtain a real channel estimation value includes: performing the channel estimation on at least one signal received by a first reception antenna and a second reception antenna, respectively, to obtain corresponding real channel estimation values $H_{LS}^1$ and $H_{LS}^2$. Values of $H_{LS}^1$ and $H_{LS}^2$ are obtained from the equations below:

$$H_{LS}^1 = H_{ideal}^1 + v^1 \quad (1)$$

$$H_{LS}^2 = H_{ideal}^2 + v^2 \quad (2)$$

In the above equations, $H_{LS}^1$ represents the real channel estimation value corresponding to the first reception antenna, $H_{ideal}^1$ represents an ideal channel estimation value of the first reception antenna, $v^1$ represents a noise value of the first reception antenna, $H_{LS}^2$ represents the real channel estimation value corresponding to the second reception antenna, $H_{ideal}^2$ represents an ideal channel estimation value of the second reception antenna, and $v^2$ represents a noise value of the second reception antenna. A transmission antenna transmits a signal through a channel, via which the first and second reception antennas receive the signal. The channel estimation is a process of estimating a model parameter of a presumed channel model from a received signal, and is a mathematical expression indicating an influence of a channel upon an input signal. In the embodiment, the channel estimation on the signal received by the first and second reception antennas is performed by utilizing a least square (LS) channel estimation algorithm—the real channel estimation values $H_{LS}^1$ and $H_{LS}^2$ respectively corresponding to the first and second reception antennas are obtained through dividing a reference signal in the received signal by a transmitted reference signal. In an alternative embodiment, a greater number of reception antennas may also be disposed, or other channel estimation algorithms may also be adopted.

In step S102, the real channel estimation value is filtered to obtain a filtered channel estimation value.

More specifically, step S102 of filtering the real channel estimation values $H_{LS}^1$ and $H_{LS}^2$ respectively corresponding to the first and second reception antennas to obtain a filtered channel estimation value includes: filtering the real channel estimation values $H_{LS}^1$ and $H_{LS}^2$ by utilizing a first filter and a second filter, respectively, to obtain corresponding filtered channel estimation values $Y_w^1(k)$, $Y_w^2(k)$, $Y_u^1(k)$ and $Y_u^2(k)$.

Values of $Y_w^1(k)$, $Y_w^2(k)$, $Y_u^1(k)$ and $Y_u^2(k)$ are calculated through the following equations:

$$Y_w^1(k) = wH_{LS}^1 \quad (3)$$

$$Y_w^2(k) = wH_{LS}^2 \quad (4)$$

$$Y_u^1(k) = uH_{LS}^1 \quad (5)$$

$$Y_u^2(k) = uH_{LS}^2 \quad (6)$$

In the above equations, $Y_w^1(k)$ represents the filtered channel estimation value corresponding to the first antenna obtained from filtering $H_{LS}^1$ by the first filter, $Y_w^2(k)$ represents the filtered channel estimation value obtained corresponding to the second antenna obtained from filtering HL by the first filter, w represents a coefficient row vector of the first filter, k represents a $k^{th}$ subcarrier on a frequency domain, $Y_u^1(k)$ represents the filtered channel estimation value corresponding to the first antenna obtained from filtering $H_{LS}^1$ by the second filter, and $Y_u^2(k)$ represents the filtered channel estimation value corresponding to the second antenna obtained from filtering $H_{LS}^2$ by the second filter, and u represents a coefficient row vector of the second filter. A filter is a component or circuit having a signal processing capability for obtaining or eliminating a predetermined frequency. The first and second filters are linearity-unassociated. The first filter may be an interpolation filter; the second filter may correspondingly be an interpolation filter linearity-unassociated with the first filter, and has the coefficient row vector u as (e−w), wherein e represents a base vector [0, . . . , 0, 1, 0, . . . , 0].

In step S103, a biased noise power value, a biased signal power value, a biased noise correlation and a biased signal correlation are calculated according to the filtered channel estimation value.

More specifically, the step of calculating a biased noise power value, a biased signal power value, a biased noise correlation and a biased signal correlation according to $Y_w^1(k)$, $Y_w^2(k)$, $Y_u^1(k)$, and $Y_u^2(k)$ obtained in step S102 includes: calculating biased noise power values $S_w^1$ and $S_w^2$, biased signal power values $S_u^1$ and $S_u^2$, a biased noise correlation $P_w^{12}$ between $Y_w^1(k)$ and $Y_w^2(k)$, and a biased signal correlation $P_u^{12}$ between $Y_u^1(k)$ and $Y_u^1(k)$ corresponding to the first reception antenna and the second reception antenna according to $Y_w^1(k)$, $Y_w^2(k)$, $Y_u^1(k)$ and $Y_u^2(k)$, respectively. Values of $S_w^1$, $S_w^2$, $S_u^1$, $S_u^2$, $P_w^{12}$ and $P_u^{12}$ are calculated through the equations below:

$$S_w^1 = E_k(Y_w^1(k) \cdot Y_w^1(k)^*) \quad (7)$$

$$S_u^1 = E_k(Y_u^1(k) \cdot Y_u^1(k)^*) \quad (8)$$

$$S_w^2 = E_k(Y_w^2(k) \cdot Y_w^2(k)^*) \quad (9)$$

$$S_u^2 = E_k(Y_u^2(k) \cdot Y_u^2(k)^*) \quad (10)$$

$$P_w^{12} = E_k(Y_w^1(k) \cdot Y_w^2(k)^*) \quad (11)$$

$$P_u^{12} = E_k(Y_u^1(k) \cdot Y_u^2(k)^*) \quad (12)$$

In the above equations, $S_w^1$ represents the biased noise power value corresponding to the first reception antenna, $S_w^2$ represents the biased noise power value corresponding to the second reception antenna, $S_u^1$ represents the biased signal power value corresponding to the first reception antenna, $S_u^2$ represents the biased signal power value corresponding to the second reception antenna, $P_w^{12}$ represents the biased noise correlation between $Y_w^1(k)$ and $Y_w^2(k)$, $P_u^{12}$ represents the biased signal correlation between $Y_u^1(k)$ and $Y_u^2(k)$, $E_k(\bullet)$ represents a frequency-domain average, and $(\bullet)^*$ represents a conjugation. Biased values in the values of the biased noise power values $S_w^1$ and $S_w^2$, the biased signal power values $S_u^1$ and $S_u^2$, the biased noise correlation $P_w^{12}$ and the biased signal correlation $P_u^{12}$ represent biased estimation values, which means that expected values of sample estimation values of parameters do not equal to real values of the parameters. For example, assume that $A'=f(x_1, x_2, \ldots, x_n)$ is a dot estimation value of an unknown parameter A. If $E(A') \neq A$, $E(A')$ is then a biased estimation value of A.

In step S104, an unbiased noise power value, an unbiased signal power value, an unbiased noise correlation and an unbiased signal correlation are calculated according to the biased noise power value, the biased signal power value, the biased noise correlation and the biased signal correlation.

More specifically, step S104 of calculating an unbiased noise power value, an unbiased signal power value, an unbiased noise correlation and an unbiased signal correlation according to the biased noise power values $S_w^1$ and $S_w^2$, the biased signal power values $S_u^1$ and $S_u^2$, the biased noise correlation $P_w^{12}$ and the biased signal correlation $P_u^{12}$ includes the steps below.

1) An unbiased noise power value $\sigma_1^2$ and an unbiased signal power value $\alpha_1^2$ corresponding to the first reception antenna are calculated as:

$$S_w^1 = E_k(Y_w^1(k) \cdot Y_w^1(k)^*) = wE[(H_{ideal}^1 + v^1)(H_{ideal}^1 + v^1)^H]w^H \quad (13)$$

$$= w(\alpha_1^2 R_{HH} + \sigma_1^2 I)w^H = \alpha_1^2 w R_{HH} w^H + \sigma_1^2 w w^H$$

It is obtained from equations (1), (5) and (9) that:

$$S_u^1 = E_k(Y_u^1(k) \cdot Y_u^1(k)^*) = uE[(H_{ideal}^1 + v^1)(H_{ideal}^1 + v^1)^H]u^H \quad (14)$$

$$= u(\alpha_1^2 R_{HH} + \sigma_1^2 I)u^H = \alpha_1^2 u R_{HH} u^H + \sigma_1^2 u u^H$$

By establishing a simultaneous equation from equations (13) and (14), it is obtained that:

$$\begin{pmatrix} S_w^1 \\ S_u^1 \end{pmatrix} = \begin{pmatrix} wR_{HH}w^H & ww^H \\ uR_{HH}u^H & uu^H \end{pmatrix} \begin{pmatrix} \alpha_1^2 \\ \sigma_1^2 \end{pmatrix} \quad (15)$$

By inverting the matrix $$\begin{pmatrix} wR_{HH}w^H & ww^H \\ uR_{HH}u^H & uu^H \end{pmatrix}$$

in equation (15), according to the biased noise power value $S_w^1$ corresponding to the first reception antenna and the biased signal power value $S_u^1$ corresponding to the first reception antenna, it is obtained that:

$$\begin{pmatrix} \alpha_1^2 \\ \sigma_1^2 \end{pmatrix} = \begin{pmatrix} wR_{HH}w^H & ww^H \\ uR_{HH}u^H & uu^H \end{pmatrix}^{-1} \begin{pmatrix} S_w^1 \\ S_u^1 \end{pmatrix} \quad (16)$$

In the above equations, $E(\bullet)$ represents an average, $(\bullet)^H$ represents a conjugate transpose, I represents a unit matrix, $R_{HH}$ represents a correlation matrix of $H_{LS}^1$ and $H_{LS}^2$ on the subcarriers, $\alpha_1^2$ represents the unbiased signal power value corresponding to the first reception antenna, and $\sigma_1^2$ represents the unbiased noise power value corresponding to the first reception antenna.

2) An unbiased noise power value $\sigma_2^2$ and an unbiased signal power value $\alpha_2^2$ corresponding to the second reception antenna are calculated as:

According to equations (2), (4) and (8), it is obtained that:

$$S_w^2 = E_k(Y_w^2(k) \cdot Y_w^2(k)^*) = wE[(H_{ideal}^2 + v^2)(H_{ideal}^2 + v^2)^H]w^H \quad (17)$$
$$= w(\alpha_2^2 R_{HH} + \sigma_2^2 I)w^H = \alpha_2^2 w R_{HH} w^H + \sigma_2^2 w w^H$$

According to equations (2), (6) and (10), it is obtained that:

$$S_u^2 = E_k(Y_u^2(k) \cdot Y_u^2(k)^*) = uE[(H_{ideal}^2 + v^2)(H_{ideal}^2 + v^2)^H]u^H \quad (18)$$
$$= u(\alpha_2^2 R_{HH} + \sigma_2^2 I)u^H = \alpha_2^2 u R_{HH} u^H + \sigma_2^2 u u^H$$

By establishing a simultaneous equation from equations (17) and (18), it is obtained that:

$$\begin{pmatrix} S_w^2 \\ S_u^2 \end{pmatrix} = \begin{pmatrix} wR_{HH}w^H & ww^H \\ uR_{HH}u^H & uu^H \end{pmatrix} \begin{pmatrix} \alpha_2^2 \\ \sigma_2^2 \end{pmatrix} \quad (19)$$

By inverting the matrix $$\begin{pmatrix} wR_{HH}w^H & ww^H \\ uR_{HH}u^H & uu^H \end{pmatrix}$$

in equation (19), according to the biased noise correlation $P_w^{12}$ and the biased signal correlation $P_u^{12}$, it is obtained that:

$$\begin{pmatrix} \alpha_2^2 \\ \sigma_2^2 \end{pmatrix} = \begin{pmatrix} wR_{HH}w^H & ww^H \\ uR_{HH}u^H & uu^H \end{pmatrix}^{-1} \begin{pmatrix} S_w^2 \\ S_u^2 \end{pmatrix} \quad (20)$$

In the above equations, $E(\bullet)$ represents an average, $(\bullet)^H$ represents a conjugate transpose, I represents a unit matrix, $R_{HH}$ represents a correlation matrix of $H_{LS}^1$ and $H_{LS}^2$ on the subcarriers, $\alpha_2^2$ represents the unbiased signal power value corresponding to the second reception antenna, and $\sigma_2^2$ represents the unbiased noise power value corresponding to the second reception antenna.

3) An unbiased signal correlation $\beta_{12}$ and an unbiased noise correlation $\gamma_{12}$ are calculated as below:

According to equations (1), (2), (3), (4) and (11), it is obtained that:

$$P_w^{12} = E_k(Y_w^1(k) \cdot Y_w^2(k)^*) = wE[(H_{ideal}^1 + v^1)(H_{ideal}^2 + v^2)^H]w^H \quad (21)$$
$$= w(\beta_{12}R_{HH} + \gamma_{12}I)w^H = \beta_{12}wR_{HH}w^H + \gamma_{12}ww^H$$

According to equations (1), (2), (5), (6) and (12), it is obtained that:

$$P_u^{12} = E_k(Y_u^1(k) \cdot Y_u^2(k)^*) = uE[(H_{ideal}^1 + v^1)(H_{ideal}^2 + v^2)^H]u^H \quad (22)$$
$$= u(\beta_{12}R_{HH} + \gamma_{12}I)u^H = \beta_{12}uR_{HH}u^H + \gamma_{12}uu^H$$

By establishing a simultaneous equation from equations (21) and (22), it is obtained that:

$$\begin{pmatrix} P_w^{12} \\ P_u^{12} \end{pmatrix} = \begin{pmatrix} wR_{HH}w^H & ww^H \\ uR_{HH}u^H & uu^H \end{pmatrix} \begin{pmatrix} \beta_{12} \\ \gamma_{12} \end{pmatrix} \quad (23)$$

By inverting the matrix $$\begin{pmatrix} wR_{HH}w^H & ww^H \\ uR_{HH}u^H & uu^H \end{pmatrix}$$

in equation (23), according to the biased noise correlation $P_w^{12}$ and the biased signal correlation $P_u^{12}$, it is obtained that:

$$\begin{pmatrix} \beta_{12} \\ \gamma_{12} \end{pmatrix} = \begin{pmatrix} wR_{HH}w^H & ww^H \\ uR_{HH}u^H & uu^H \end{pmatrix}^{-1} \begin{pmatrix} P_w^{12} \\ P_u^{12} \end{pmatrix} \quad (24)$$

In the above equations, $\beta_{12}$ represents the unbiased signal correlation between $Y_u^1(k)$ and $Y_u^2(k)$, and $\gamma_{12}$ represents the unbiased noise correlation between $Y_w^1(k)$ and $Y_w^2(k)$. Unbiased values in the values of the unbiased noise power values $\sigma_1^2$ and $\sigma_2^2$, the unbiased signal power values $\alpha_1^2$ and $\alpha_2^2$, the unbiased noise correlation $\gamma_{12}$ and the unbiased signal correlation $\beta_{12}$ represent unbiased estimation values, which means that expected values of sample estimation values of parameters equal to real values of the parameters. For example, assume that $B' = g(x_1, x_2, \ldots, x_n)$ is a dot estimation value of an unknown parameter B. If $E(B') = B$, $E(B')$ is then an unbiased estimation value of B.

From equations (16), (20) and (24), the unbiased signal power value $\alpha_1^2$ and the unbiased noise power value $\sigma_1^2$ corresponding to the first reception antenna, the unbiased signal power value $\alpha_2^2$ and the unbiased noise power value $\sigma_2^2$ corresponding to the second reception antenna, the unbiased signal correlation $\beta_{12}$ between $Y_u^1(k)$ and $Y_u^2(k)$, and the unbiased noise correlation $\beta_{12}$ between $Y_w^1(k)$ and $Y_w^2(k)$ can be calculated. It is apparent that, the calculations for the above unbiased estimation values all involve the inverted matrix $$\begin{pmatrix} wR_{HH}w^H & ww^H \\ uR_{HH}u^H & uu^H \end{pmatrix}^{-1}$$

of the same two-order matrix, and multiple unbiased estimation values including unbiased signal power values can be obtained through one simple signal calculation process on the inverted matrix.

Therefore, in the channel and noise estimation method according to the first embodiment of the present invention, channel estimation is performed on a received signal to obtain a real channel estimation value, which is then filtered to obtain a filtered channel estimation value. A biased noise power value, a biased signal power value, a biased noise correlation and a biased signal correlation are calculated according to the filtered channel estimation value. An unbiased noise power value, an unbiased signal power value, an unbiased noise correlation and an unbiased signal correlation are then calculated according to the biased noise power value, the biased signal power value, the biased noise correlation, the biased signal correlation and an inverted two-order matrix. As such, signal and noise estimation complexities can be reduced while also enhancing an estimation accuracy.

Figure 2:
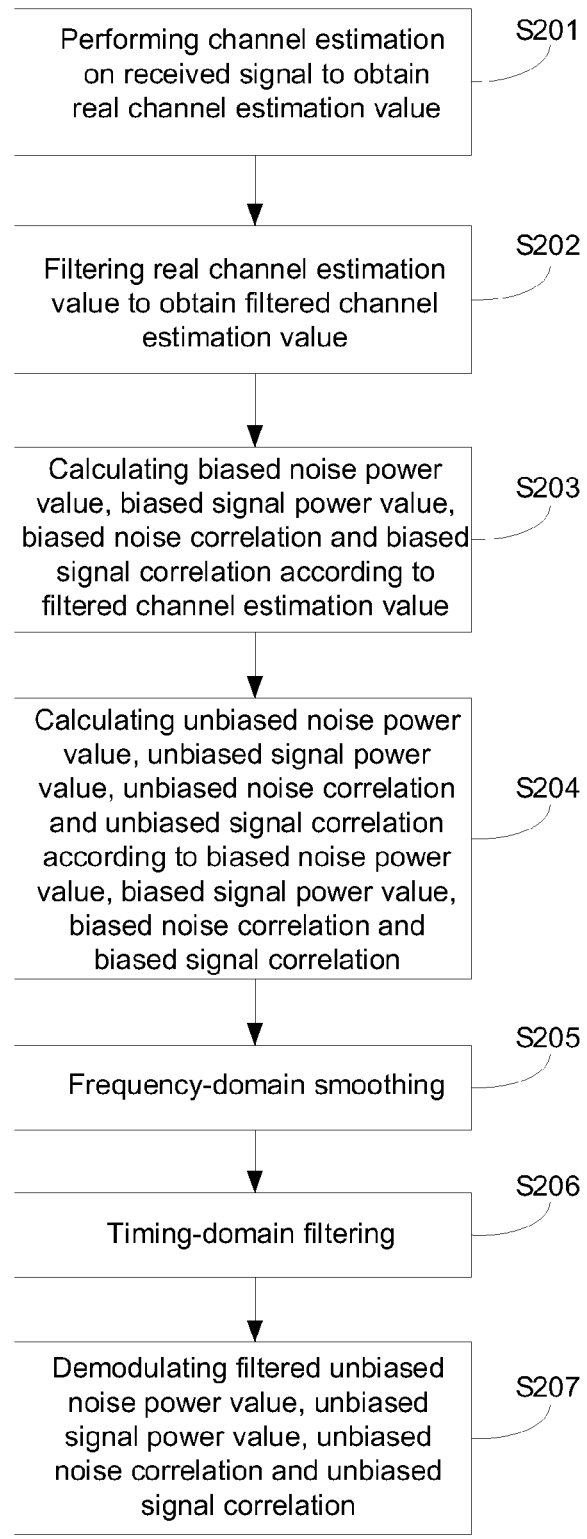
FIG. 2 is a flowchart of a channel and noise estimation method according to a second embodiment of the present invention.

FIG. 2 shows a flowchart of a channel and noise estimation method according to a second embodiment of the present invention. The method includes the following steps.

In step S201, channel estimation is performed on a received signal to obtain a real channel estimation value. That is, channel estimation is performed on a signal received by a first reception antenna and a second reception antenna, respectively, to obtain corresponding real channel estimation values $H_{LS}^1$ and $H_{LS}^2$.

In step S202, the real channel estimation values $H_{LS}^1$ and $H_{LS}^2$ corresponding to the first and second reception antennas are filtered by a first filter and a second filter, respectively, to obtain filtered channel estimation value values $Y_w^1(k)$, $Y_w^2(k)$, $Y_u^1(k)$, and $Y_u^2(k)$. Wherein, $Y_w^1(k)$ represents the filtered channel estimation value corresponding to the first antenna obtained from filtering $H_{LS}^1$ by the first filter, $Y_w^2(k)$ represents the filtered channel estimation value obtained corresponding to the second antenna obtained from filtering $H_{LS}^2$ by the first filter, $Y_u^1(k)$ represents the filtered channel estimation value corresponding to the first antenna obtained from filtering $H_{LS}^1$ by the second filter, and $Y_u^2(k)$ represents the filtered channel estimation value corresponding to the second antenna obtained from filtering $H_{LS}^2$ by the second filter.

In step S203, a biased noise power value, a biased signal power value, a biased noise correlation and a biased signal correlation are calculated according to the filtered channel estimation values. More specifically, biased noise power values $S_w^1$ and $S_w^2$, biased signal power values $S_u^1$ and $S_u^2$, a biased noise correlation $P_w^{12}$ between $Y_w^1(k)$ and $Y_w^2(k)$, and a biased signal correlation $P_u^{12}$ between $Y_u^1(k)$ and $Y_u^2(k)$ corresponding to the first reception antenna and the second reception antenna are calculated according to $Y_w^1(k)$, $Y_w^2(k)$, $Y_u^1(k)$ and $Y_u^2(k)$ obtained in step S202.

In step S204, an unbiased noise power value, an unbiased signal power value, an unbiased noise correlation and an unbiased signal correlation are calculated according to the biased noise power values, the biased signal power values, the biased noise correlation and the biased signal correlation. More specifically, an unbiased noise power value, an unbiased signal power value, an unbiased noise correlation and an unbiased signal correlation are calculated according to the biased noise power values $S_w^1$ and $S_w^2$, the biased signal power values $S_u^1$ and $S_u^2$, the biased noise correlation $P_w^{12}$, and the biased signal correlation $P_u^{12}$. The unbiased estimation values including the noise power values are obtained through the equations below:

$$\begin{pmatrix} \alpha_1^2 \\ \sigma_1^2 \end{pmatrix} = \begin{pmatrix} wR_{HH}w^H & ww^H \\ uR_{HH}u^H & uu^H \end{pmatrix}^{-1} \begin{pmatrix} S_w^1 \\ S_u^1 \end{pmatrix},$$

$$\begin{pmatrix} \alpha_2^2 \\ \sigma_2^2 \end{pmatrix} = \begin{pmatrix} wR_{HH}w^H & ww^H \\ uR_{HH}u^H & uu^H \end{pmatrix}^{-1} \begin{pmatrix} S_w^2 \\ S_u^2 \end{pmatrix}$$

$$\begin{pmatrix} \beta_{12} \\ \gamma_{12} \end{pmatrix} = \begin{pmatrix} wR_{HH}w^H & ww^H \\ uR_{HH}u^H & uu^H \end{pmatrix}^{-1} \begin{pmatrix} P_w^{12} \\ P_u^{12} \end{pmatrix}$$

In the above equations, $\alpha_1^2$ represents the unbiased signal power value corresponding to the first reception antenna, $\sigma_1^2$ represents the unbiased noise power value corresponding to the first reception antenna, $\alpha_2^2$ represents the unbiased signal power value corresponding to the second reception antenna, $\sigma_2^2$ represents the unbiased noise power value corresponding to the second reception antenna, $\beta_{12}$ represents the unbiased signal correlation between $Y_u^1(k)$ and $Y_u^2(k)$, and $\gamma_{12}$ represents the unbiased noise correlation between $Y_w^1(k)$ and $Y_w^2(k)$.

In step S205, frequency-domain smoothing is performed. That is, unbiased noise power values $\sigma_1^2$ and $\sigma_2^2$, the unbiased signal power values $\alpha_1^2$ and $\alpha_2^2$, the unbiased noise correlation $\gamma_{12}$ and the unbiased signal correlation $\beta_{12}$ are frequency-domain smoothed by utilizing a moving average filter to average the input information including the unbiased noise power values.

In step S206, a time-domain filter process is performed. The unbiased noise power values $\sigma_1^2$ and $\sigma_2^2$, the unbiased signal power values $\alpha_1^2$ and $\alpha_2^2$, the unbiased noise correlation $\gamma_{12}$ and the unbiased signal correlation $\beta_{12}$ that are frequency-domain smoothed are time-domain filtered by utilizing an infinite impulse response (IIR) filter to filter out a predetermined frequency band from the signals for an enhanced estimation accuracy.

In step S207, the frequency-smoothed and filtered unbiased noise power values, unbiased signal power values, unbiased noise correlation and unbiased signal correlation are demodulated. More specifically, the filtered unbiased noise power values $\sigma_1^2$ and $\sigma_2^2$, unbiased signal power values $\alpha_1^2$ and $\alpha_2^2$, unbiased noise correlation $\gamma_{12}$ and unbiased signal correlation $\beta_{12}$ are demodulated by utilizing a demodulator or a demodulation circuit. That is, original transmission signals are restored from the received modulated signals to obtain a preferred signal demodulation result. The unbiased estimation values including the unbiased signal power values may also be applied to a link adaption module in an LTE system.

Figure 3:
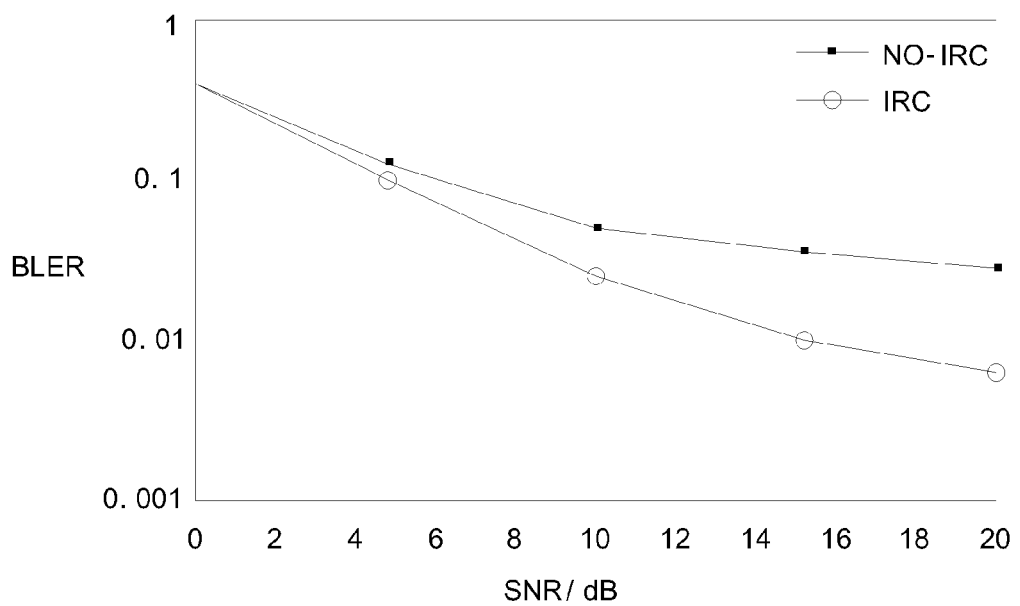
FIG. 3 is a comparison diagram of demodulation performance of demodulation performed by utilizing a noise matrix and by utilizing only elements at diagonal lines of a noise matrix according to the second embodiment of the present invention.

FIG. 3 is a comparison diagram of demodulation performance of interference rejection combining (IRC) demodulation performed by utilizing a noise matrix $$\begin{bmatrix} \sigma_1^2 & \gamma_{12}\sigma_1\sigma_2 \\ (\gamma_{12}\sigma_1\sigma_2)^* & \sigma_2^2 \end{bmatrix}$$

formed by the unbiased noise correlation $\gamma_{12}$ and the unbiased noise power values $\sigma_1^2$ and $\sigma_2^2$, and by utilizing only elements at diagonal lines of a noise matrix according to an embodiment of the present invention. Referring to FIG. 3, under the same SNR, an error block rate (BLER) obtained from IRC demodulation based on the noise matrix formed by the unbiased noise correlation and the unbiased noise power values from calculations of the embodiment is lower than a BLER corresponding to maximum ratio combining (MRC) demodulation based on the elements on the diagonal lines of the noise matrix. Therefore, a preferred demodulation result can be obtained by utilizing the noise matrix formed by the unbiased noise correlation and the unbiased noise power values.

Therefore, in the channel and noise estimation method according to the second embodiment of the present invention, channel estimation is performed on a received signal to obtain a real channel estimation value, which is then filtered to obtain a filtered channel estimation value. A biased noise power value, a biased signal power value, a biased noise correlation and a biased signal correlation are calculated according to the filtered channel estimation value. An unbiased noise power value, an unbiased signal power value, an unbiased noise correlation and an unbiased signal correlation are then calculated according to the biased noise power value, the biased signal power value, the biased noise correlation, the biased signal correlation and an inverted two-order matrix. The unbiased estimation values including the unbiased noise power values are frequency-domain smoothed, filtered and demodulated. As such, signal and noise estimation complexities can be reduced while also enhancing an estimation accuracy.

Figure 4:
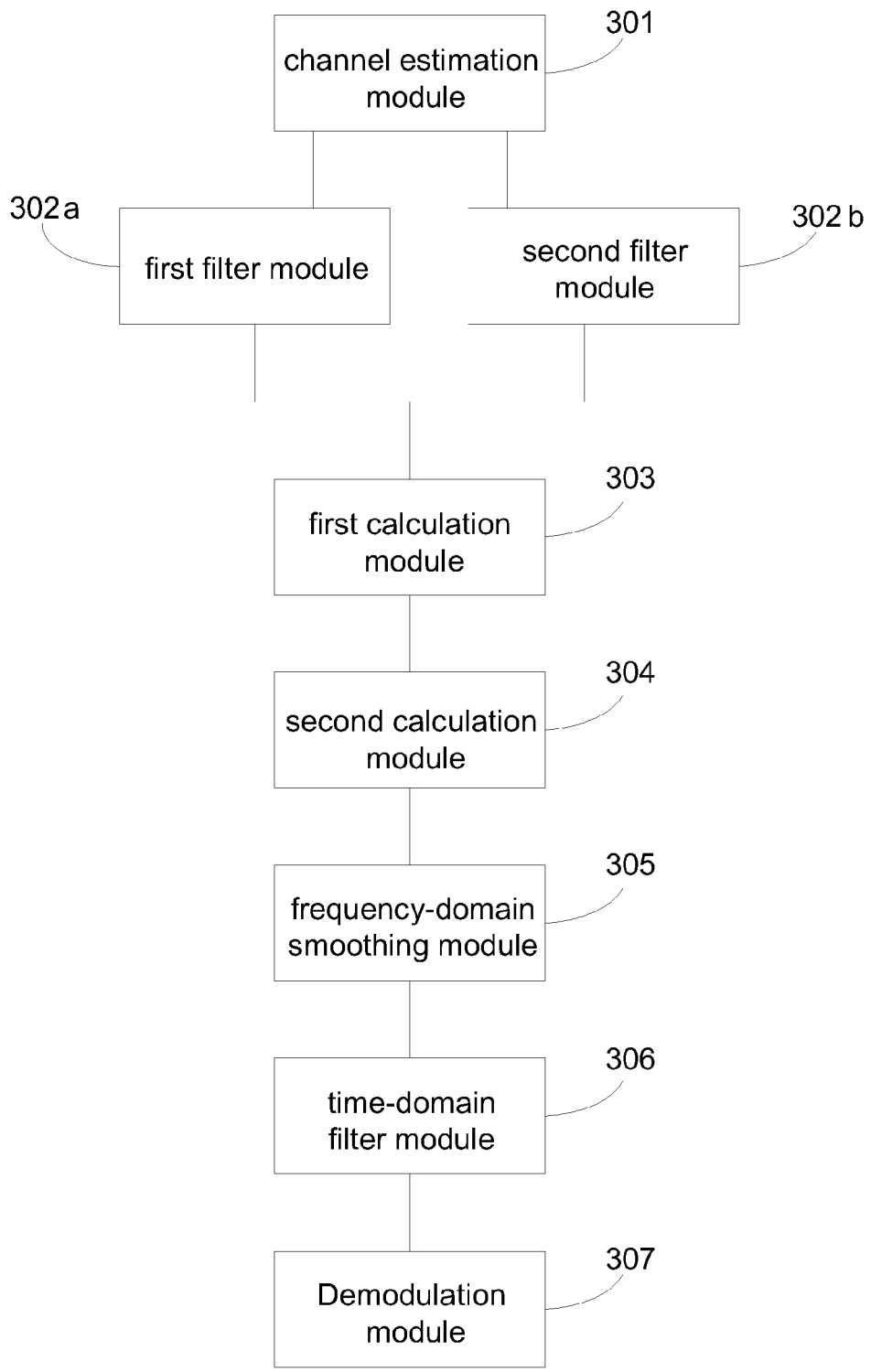
FIG. 4 is a block diagram of a channel and noise estimation apparatus according to an embodiment of the present invention.

FIG. 4 shows a block diagram of a channel and noise estimation apparatus according to an embodiment of the present invention.

Referring to FIG. 4, channel estimation module 301 performs channel estimation on a received signal to obtain a real channel estimation value. More specifically, the channel estimation module 301 performs channel estimation on at least one signal received by a first reception antenna and a second reception antenna, respectively, to obtain corresponding real channel estimation values $H_{LS}^1$ and $H_{LS}^2$.

Values of $H_{LS}^1$ and $H_{LS}^2$ are:

$$H_{LS}^1 = H_{ideal}^1 + v^1 \quad (1)$$

$$H_{LS}^2 = H_{ideal}^2 + v^2 \quad (2)$$

In the above equations, $H_{LS}^1$ represents the real channel estimation value corresponding to the first reception antenna, $H_{ideal}^1$ represents an ideal channel estimation value of the first reception antenna, $v^1$ represents a noise value of the first reception antenna, $H_{LS}^2$ represents the real channel estimation value corresponding to the second reception antenna, $H_{ideal}^2$ represents an ideal channel estimation value of the second reception antenna, and $v^2$ represents a noise value of the second reception antenna. In an alternative embodiment, a greater number of antennas may be disposed.

A first filter module 302a and a second filter module 302b respectively filter the real channel estimation values to obtain filtered channel estimation values. More specifically, the filter module 302a and the second filter module 302b respectively filter the real channel estimation values $H_{LS}^1$ and $H_{LS}^2$ to obtain corresponding filtered channel estimation values $Y_w^1(k)$, $Y_w^2(k)$, $Y_u^1(k)$ and $Y_u^2(k)$. Values of $Y_w^1(k)$, $Y_w^2(k)$, $Y_u^1(k)$, $Y_u^2(k)$ are calculated through the following equations:

$$Y_w^1(k) = wH_{LS}^1 \quad (3)$$

$$Y_w^2(k) = wH_{LS}^2 \quad (4)$$

$$Y_u^1(k) = uH_{LS}^1 \quad (5)$$

$$Y_u^2(k) = uH_{LS}^2 \quad (6)$$

In the above equations, $Y_w^1(k)$ represents the filtered channel estimation value obtained from filtering $H_{LS}^1$ by the first filter module 302a, $Y_w^2(k)$ represents the filtered channel estimation value obtained from filtering $H_{LS}^2$ filtered by the first filter module 302a, $w$ represents a coefficient row vector of the first filter module 302a, $k$ represents a $k^{th}$ subcarrier on a frequency domain, $Y_u^1(k)$ represents the filtered channel estimation value obtained from filter $H_{LS}^1$, filtered by the second filter module 302b, $Y_u^2(k)$ represents the filtered channel estimation value obtained from filtering $H_{LS}^2$ filtered by the second filter module 302b, and $u$ represents a coefficient row vector of the second filter module 302b. The first filter module 302a and the second filter module 302b are linearity-unassociated. The first filter module 302a may be an interpolation filter, and the second filter module 302b may be correspondingly an interpolation filter that is linearity-unassociated with the first filter module 302a.

A first calculation module 303 calculates a biased noise power value, a biased signal power value, a biased noise correlation and a biased signal correlation according to the filtered channel estimation values obtained by the first filter module 302a and the second filter module 302b. More specifically, the first calculation module 303 calculates biased noise power values $S_w^1$ and $S_w^2$, biased signal power values $S_u^1$ and $S_u^2$, a biased noise correlation $P_w^{12}$ between $Y_w^1(k)$ and $Y_w^2(k)$, and a biased signal correlation $P_u^{12}$ between $Y_u^1(k)$ and $Y_u^2(k)$ corresponding to the first reception antenna and the second reception antenna according to $Y_w^1(k)$, $Y_w^2(k)$, $Y_u^1(k)$ and $Y_u^2(k)$. Values of $S_w^1$, $S_w^2$, $S_u^1$, $S_u^2$, $P_w^{12}$ and $P_u^{12}$ are calculated through the equations below:

$$S_w^1 = E_k(Y_w^1(k) \cdot Y_w^1(k)^*) \quad (7)$$

$$S_w^2 = E_k(Y_w^2(k) \cdot Y_w^2(k)^*) \quad (8)$$

$$S_u^1 = E_k(Y_u^1(k) \cdot Y_u^1(k)^*) \quad (9)$$

$$S_u^2 = E_k(Y_u^2(k) \cdot Y_u^2(k)^*) \quad (10)$$

$$P_w^{12} = E_k(Y_w^1(k) \cdot Y_w^2(k)^*) \quad (11)$$

$$P_u^{12} = E_k(Y_u^1(k) \cdot Y_u^2(k)^*) \quad (12)$$

In the above equations, $S_w^1$ represents the biased noise power value corresponding to the first reception antenna, $S_w^2$ represents the biased noise power value corresponding to the second reception antenna, $S_u^1$ represents the biased signal power value corresponding to the first reception antenna, $S_u^2$ represents the biased signal power value corresponding to the second reception antenna, $P_w^{12}$ represents the biased noise correlation, $P_u^{12}$ represents the biased signal correlation, $E_k(\bullet)$ represents a frequency-domain average, and $(\bullet)$ represents a conjugation.

A second calculation module 304 calculates an unbiased noise power value, an unbiased signal power value, an unbiased noise correlation and an unbiased signal correlation according to the biased noise power value, the biased signal power value, the biased noise correlation and the biased signal correlation. More specifically, according to equations (1), (3) and (7), the second calculation module 304 obtains that:

$$S_w^1 = E_k(Y_w^1(k) \cdot Y_w^1(k)^*) = wE[(H_{ideal}^1 + v^1)(H_{ideal}^1 + v^1)^H]w^H \quad (13)$$
$$= w(\alpha_1^2 R_{HH} + \sigma_1^2 I)w^H = \alpha_1^2 w R_{HH} w^H + \sigma_1^2 w w^H$$

More specifically, according to equations (1), (5) and (9), the second calculation module 304 obtains that:

$$S_u^1 = E_k(Y_u^1(k) \cdot Y_u^1(k)^*) = uE[(H_{ideal}^1 + v^1)(H_{ideal}^1 + v^1)^H]u^H \quad (14)$$
$$= u(\alpha_1^2 R_{HH} + \sigma_1^2 I)u^H = \alpha_1^2 u R_{HH} u^H + \sigma_1^2 u u^H$$

By establishing a simultaneous equation from equations (13) and (14), the second calculation module 304 obtains that:

$$\begin{pmatrix} S_w^1 \\ S_u^1 \end{pmatrix} = \begin{pmatrix} wR_{HH}w^H & ww^H \\ uR_{HH}u^H & uu^H \end{pmatrix} \begin{pmatrix} \alpha_1^2 \\ \sigma_1^2 \end{pmatrix} \quad (15)$$

By inverting the matrix $$\begin{pmatrix} wR_{HH}w^H & ww^H \\ uR_{HH}u^H & uu^H \end{pmatrix}$$

in equation (15), according to the biased noise power value $S_w^1$ corresponding to the first reception antenna and the biased signal power value $S_u^1$ corresponding to the first reception antenna, the second calculation module 304 obtains that:

$$\begin{pmatrix} \alpha_1^2 \\ \sigma_1^2 \end{pmatrix} = \begin{pmatrix} wR_{HH}w^H & ww^H \\ uR_{HH}u^H & uu^H \end{pmatrix}^{-1} \begin{pmatrix} S_w^1 \\ S_u^1 \end{pmatrix} \quad (16)$$

In the above equation, $E(\bullet)$ represents an average, $(\bullet)^H$ represents a conjugate transpose, I represents a unit matrix, $R_{HH}$ represents a correlation matrix of $H_{LS}^1$ and $H_{LS}^2$ on the subcarriers, $\alpha_1^2$ represents the unbiased signal power value corresponding to the first reception antenna, and $\sigma_1^2$ represents the unbiased noise power value corresponding to the first reception antenna.

Similarly, the second calculation module 304 obtains an unbiased signal power value $\alpha_2^2$ corresponding to the second reception antenna and an unbiased noise power value $\sigma_2^2$ corresponding to the second reception antenna.

More specifically, according to equations (1), (2), (3), (4) and (11), the second calculation module 304 obtains that:

$$P_w^{12} = E_k(Y_w^1(k) \cdot Y_w^2(k)^*) = wE[(H_{ideal}^1 + v^1)(H_{ideal}^2 + v^2)^H]w^H \quad (17)$$
$$= w(\beta_{12}R_{HH} + \gamma_{12}I)w^H = \beta_{12}wR_{HH}w^H + \gamma_{12}ww^H$$

More specifically, according to equations (1), (2), (5), (6) and (12), the second calculation module 304 obtains that:

$$P_u^{12} = E_k(Y_u^1(k) \cdot Y_u^2(k)^*) = uE[(H_{ideal}^1 + v^1)(H_{ideal}^2 + V^2)^H]u^H \quad (18)$$
$$= u(\beta_{12}R_{HH} + \gamma_{12}I)u^H = \beta_{12}uR_{HH}u^H + \gamma_{12}uu^H$$

By establishing a simultaneous equation from equations (17) and (18), the second calculation module 304 obtains that:

$$\begin{pmatrix} P_w^{12} \\ P_u^{12} \end{pmatrix} = \begin{pmatrix} wR_{HH}w^H & ww^H \\ uR_{HH}u^H & uu^H \end{pmatrix} \begin{pmatrix} \beta_{12} \\ \gamma_{12} \end{pmatrix} \quad (19)$$

More specifically, by inverting the matrix $$\begin{pmatrix} wR_{HH}w^H & ww^H \\ uR_{HH}u^H & uu^H \end{pmatrix}$$

in equation (19), according to the biased noise correlation $P_w^{12}$ and the biased signal correlation $P_u^{12}$, the second calculation module 304 obtains that:

$$\begin{pmatrix} \beta_{12} \\ \gamma_{12} \end{pmatrix} = \begin{pmatrix} wR_{HH}w^H & ww^H \\ uR_{HH}u^H & uu^H \end{pmatrix}^{-1} \begin{pmatrix} P_w^{12} \\ P_u^{12} \end{pmatrix} \quad (20)$$

In the above equation, $\beta_{12}$ represents the unbiased signal correlation between $Y_u^1(k)$ and $Y_u^2(k)$, and $\beta_{12}$ represents the unbiased noise correlation between $Y_w^1(k)$ and $Y_w^2(k)$. In an alternative embodiment, the first calculation module 303 and the second calculation module 304 may also be integrated into one module.

The channel and noise estimation apparatus further includes a frequency-domain smoothing module 305. The frequency-domain smoothing module 305 frequency-domain smoothes the unbiased noise power values $\sigma_1^2$ and $\sigma_2^2$, the unbiased signal power values $\alpha_1^2$ and $\alpha_2^2$, the unbiased noise correlation $\gamma_{12}$ and the unbiased signal correlation $\beta_{12}$ obtained by the second calculation module 304. The frequency-domain smoothing module 305 may be a moving average filter.

The channel and noise estimation apparatus further includes a time-domain filter module 306. The time-domain filter module 306 time-domain filters the frequency-domain smoothed unbiased noise power value $\sigma_1^2$ and $\sigma_2^2$, unbiased signal power values $\alpha_1^2$ and $\alpha_2^2$, unbiased noise correlation $\gamma_{12}$ and unbiased signal correlation $\beta_{12}$. The time-domain filter module 306 may be an IIR filter.

The channel and noise estimation apparatus further include a demodulation module 307. The demodulation module 307 demodulates the filtered unbiased noise power values $\sigma_1^2$ and $\sigma_2^2$, unbiased signal power values $\alpha_1^2$ and $\alpha_2^2$, unbiased noise correlation $\gamma_{12}$ and unbiased signal correlation $\beta_{12}$ to restore original transmission signals. The demodulation module 307 may be a demodulator or a demodulation circuit.

Thus, in the channel and noise estimation apparatus according to an embodiment of the present invention, the channel estimation module 301 performs channel estimation on a received signal to obtain a real channel estimation value, which is respectively filtered by the first filter module 302a and the second filter module 302b to obtain a filtered channel estimation value. According to the filtered channel estimation values, the first calculation module 303 calculates a biased noise power value, a biased signal power value, a biased noise correlation and a biased signal correlation. According to the biased noise power value, the biased signal power value, the biased noise correlation, the biased signal correlation and the inverted two-order matrix obtained, the second calculation module 304 calculates an unbiased noise power value, an unbiased signal power value, an unbiased noise correlation and a biased signal correlation. As such, signal and noise estimation complexities can be reduced while also enhancing an estimation accuracy.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A channel and noise estimation method, applied to a channel and noise estimation apparatus of a wireless communication system, the channel and noise estimation method comprising:
performing channel estimation on a received signal to obtain a real channel estimation value;
filtering the real channel estimation value to obtain a filtered channel estimation value;
calculating a biased noise power value, a biased signal power value, a biased noise correlation and a biased signal correlation according to the filtered channel estimation value; and
respectively calculating an unbiased noise power value, an unbiased signal power value, an unbiased noise correlation and an unbiased signal correlation according to the biased noise power value, the biased signal power value, the biased noise correlation and the biased signal correlation by using a first inverted matrix;
wherein the step of performing the channel estimation on the received signal to obtain the real channel estimation value comprises:
performing the channel estimation on at least one signal received by a first reception antenna and a second reception antenna, respectively, to obtain corresponding real channel estimation values $H_{LS}^1$ and $H_{LS}^2$, where $H_{LS}^1$ represents the real channel estimation value corresponding to the first reception antenna, and $H_{LS}^2$ represents the real channel estimation value corresponding to the second reception antenna;
wherein the step of filtering the real channel estimation value to obtain the filtered channel estimation value comprises:
filtering the real channel estimation values $H_{LS}^1$ and $H_{LS}^2$ by utilizing a first filter and a second filter, respectively, to obtain corresponding filtered channel estimation values $Y_w^1(k)$, $Y_w^2(k)$, $Y_u^1(k)$ and $Y_u^2(k)$, where $Y_w^1(k)$ represents the filtered channel estimation value obtained from filtering $H_{LS}^1$ by the first filter, $Y_w^2(k)$ represents the filtered channel estimation value obtained from filtering $H_{LS}^2$ by the first filter, $Y_u^1(k)$ represents the filtered channel estimation value obtained from filtering $H_{LS}^1$ by the second filter, and $Y_u^2(k)$ represents the filtered channel estimation value obtained from filtering $H_{LS}^2$ by the second filter;
wherein values of $H_{LS}^1$ and $H_{LS}^2$ are:

$$H_{LS}^1 = H_{ideal}^1 + v^1 \quad (1)$$

$$H_{LS}^2 = H_{ideal}^2 + v^2 \quad (2)$$

where $H_{ideal}^1$ represents an ideal channel estimation value of the first reception antenna, $v^1$ represents a noise value of the first reception antenna, $H_{ideal}^2$ represents an ideal channel estimation value of the second reception antenna, and $v^2$ represents a noise value of the second reception antenna; and
values of $Y_w^1(k)$, $Y_w^2(k)$, $Y_u^1(k)$ and $Y_u^2(k)$ are calculated through following equations:

$$Y_w^1(k) = wH_{LS}^1 \quad (3)$$

$$Y_w^2(k) = wH_{LS}^2 \quad (4)$$

$$Y_u^1(k) = uH_{LS}^1 \quad (5)$$

$$Y_u^2(k) = uH_{LS}^2 \quad (6)$$

where w represents a coefficient row vector of the first filter, k represents a $k^{th}$ subcarrier on a frequency domain, and u represents a coefficient row vector of the second filter; and
wherein the step of calculating the biased noise power value, the biased signal power value, the biased noise correlation and the biased signal correlation according to the filtered channel estimation value comprises:
calculating biased noise power values $S_w^1$ and $S_w^2$, biased signal power values $S_u^1$ and $S_u^2$, a biased noise correlation $P_w^{12}$ between $Y_w^1(k)$ and $Y_w^2(k)$, and a biased signal correlation $P_u^{12}$ between $Y_u^1(k)$ and $Y_u^2(k)$ corresponding to the first reception antenna and the second reception antenna according to $Y_w^1(k)$, $Y_w^2(k)$, $Y_u^1(k)$ and $Y_u^1(k)$, respectively; and
values of $S_w^1$, $S_w^2$, $S_u^1$, $S_u^2$, $P_w^{12}$ and $P_u^{12}$ are calculated through following equations:

$$S_w^1 = E_k(Y_w^1(k) \cdot Y_w^1(k)^*) \quad (7)$$

$$S_w^2 = E_k(Y_w^2(k) \cdot Y_w^2(k)^*) \quad (8)$$

$$S_u^1 = E_k(Y_u^1(k) \cdot Y_u^1(k)^*) \quad (9)$$

$$S_u^2 = E_k(Y_u^2(k) \cdot Y_u^2(k)^*) \quad (10)$$

$$P_w^{12} = E_k(Y_w^1(k) \cdot Y_w^2(k)^*) \quad (11)$$

$$P_u^{12} = E_k(Y_u^1(k) \cdot Y_u^2(k)^*) \quad (12)$$

where $S_w^1$ represents the biased noise power value corresponding to the first reception antenna, $S_w^2$ represents the biased noise power value corresponding to the second reception antenna, $S_u^1$ represents the biased signal power value corresponding to the first reception antenna, $S_u^2$ represents the biased signal power value corresponding to the second reception antenna, $P_w^{12}$ represents the biased noise correlation between $Y_w^1(k)$ and $Y_w^2(k)$, $P_u^{12}$ represents the biased signal correlation between $Y_u^1(k)$ and $Y_u^2(k)$, $E_k(\bullet)$ represents a frequency-domain average, and $(\bullet)^*$ represents a conjugation; and
wherein after the step of calculating the unbiased noise power value, the unbiased signal power value, the unbiased noise correlation and the unbiased signal correlation according to the biased noise power value, the biased signal power value, the biased noise correlation and the biased signal correlation, the method further comprising:
frequency-domain smoothing the unbiased noise power value, the unbiased signal power value, the unbiased noise correlation and the unbiased signal correlation;
time-domain filtering the frequency-domain smoothed unbiased noise power value, unbiased signal power value, unbiased noise correlation and unbiased signal correlation; and
demodulating the filtered unbiased noise power value, unbiased signal power value, unbiased noise correlation and unbiased signal correlation to restore an original transmission signal.

2. The channel and noise estimation method according to claim 1, wherein the first and second filters are linearity-unassociated.

3. The channel and noise estimation method according to claim 1, wherein the step of calculating the unbiased noise power value, the unbiased signal power value, the unbiased noise correlation and the unbiased signal correlation according to the biased noise power value, the biased signal power value, the biased noise correlation and the biased signal correlation comprises:

obtaining according to equations (1), (3) and (7) that:

$$S_w^1 = E_k(Y_w^1(k) \cdot Y_w^1(k)^*) = wE[(H_{ideal}^1 + v^1)(H_{ideal}^1 + v^1)^H]w^H \quad (13)$$
$$= w(\alpha_1^2 R_{HH} + \sigma_1^2 I)w^H = \alpha_1^2 w R_{HH} w^H + \sigma_1^2 w w^H;$$

obtaining according to equations (1), (5) and (9) that:

$$S_u^1 = E_k(Y_u^1(k) \cdot Y_u^1(k)^*) = uE[(H_{ideal}^1 + v^1)(H_{ideal}^1 + v^1)^H]u^H \quad (14)$$
$$= u(\alpha_1^2 R_{HH} + \sigma_1^2 I)u^H = \alpha_1^2 u R_{HH} u^H + \sigma_1^2 u u^H;$$

by establishing a simultaneous equation from equations (13) and (14), obtaining that:

$$\begin{pmatrix} S_w^1 \\ S_u^1 \end{pmatrix} = \begin{pmatrix} wR_{HH}w^H & ww^H \\ uR_{HH}u^H & uu^H \end{pmatrix} \begin{pmatrix} \alpha_1^2 \\ \sigma_1^2 \end{pmatrix}; \quad (15)$$

$$\begin{pmatrix} wR_{HH}w^H & ww^H \\ uR_{HH}u^H & uu^H \end{pmatrix}$$

by inverting the matrix in equation (15), according to the biased noise power value $S_w^1$ corresponding to the first reception antenna and the biased signal power value $S_u^1$ corresponding to the first reception antenna, obtaining that:

$$\begin{pmatrix} \alpha_1^2 \\ \sigma_1^2 \end{pmatrix} = \begin{pmatrix} wR_{HH}w^H & ww^H \\ uR_{HH}u^H & uu^H \end{pmatrix}^{-1} \begin{pmatrix} S_w^1 \\ S_u^1 \end{pmatrix}, \quad (16)$$

where E(●) represents an average, (●)$^H$ represents a conjugate transpose, I represents a unit matrix, $R_{HH}$ represents a correlation matrix of $H_{LS}^1$ and $H_{LS}^2$ on the sub-carriers, $\alpha_1^2$ the unbiased signal power value corresponding to the first reception antenna, and $\sigma_1^2$ represents the unbiased noise power value corresponding to the first reception antenna;

for an unbiased signal power value $\alpha_2^2$ corresponding to the second reception antenna and an unbiased noise power value $\sigma_2^2$ corresponding to the second reception antenna, obtaining according to equations (1), (2), (3), (4) and (11) that:

$$P_w^{12} = E_k(Y_w^1(k) \cdot Y_w^2(k)^*) = wE[(H_{ideal}^1 + v^1)(H_{ideal}^2 + v^2)^H]w^H \quad (17)$$
$$= w(\beta_{12}R_{HH} + \gamma_{12}I)w^H = \beta_{12}wR_{HH}w^H + \gamma_{12}ww^H;$$

obtaining according to equations (1), (2), (5), (6) and (12) that:

$$P_u^{12} = E_k(Y_u^1(k) \cdot Y_u^2(k)^*) = uE[(H_{ideal}^1 + v^1)(H_{ideal}^2 + v^2)^H]u^H \quad (18)$$
$$= u(\beta_{12}R_{HH} + \gamma_{12}I)u^H = \beta_{12}uR_{HH}u^H + \gamma_{12}uu^H;$$

by establishing a simultaneous equation from equations (17) and (18), obtaining that:

$$\begin{pmatrix} P_w^{12} \\ P_u^{12} \end{pmatrix} = \begin{pmatrix} wR_{HH}w^H & ww^H \\ uR_{HH}u^H & uu^H \end{pmatrix} \begin{pmatrix} \beta_{12} \\ \gamma_{12} \end{pmatrix}; \quad (19)$$

and
by inverting the matrix $$\begin{pmatrix} wR_{HH}w^H & ww^H \\ uR_{HH}u^H & uu^H \end{pmatrix}$$

in equation (19), according to the biased noise correlation $P_w^{12}$ and the biased signal correlation $P_u^{12}$, obtaining that:

$$\begin{pmatrix} \beta_{12} \\ \gamma_{12} \end{pmatrix} = \begin{pmatrix} wR_{HH}w^H & ww^H \\ uR_{HH}u^H & uu^H \end{pmatrix}^{-1} \begin{pmatrix} P_w^{12} \\ P_u^{12} \end{pmatrix}, \quad (20)$$

where $\beta_{12}$ represents the unbiased signal correlation between $Y_u^1(k)$ and $Y_u^2(k)$, and $\gamma_{12}$ represents the unbiased noise correlation between $Y_w^1(k)$ and $Y_w^2(k)$.

4. A channel and noise estimation apparatus of a wireless communication system, the channel and noise estimation apparatus comprising:

a channel estimation module, wherein the channel estimation module is stored in a non-transitory computer-readable storage media, for performing channel estimation on a received signal to obtain a real channel estimation value;

a first filter module and a second filter module, wherein the first filter module and second filter module are stored in a non-transitory computer-readable storage media, for filtering the real channel estimation value to obtain a filtered channel estimation value, respectively;

a first calculation module, wherein the first calculation module is stored in a non-transitory computer-readable storage media, for calculating a biased noise power value, a biased signal power value, a biased noise correlation and a biased signal correlation according to the filtered channel estimation values; and a second calculation module, wherein the second calculation module is stored in a non-transitory computer-readable storage media, for respectively calculating an unbiased noise power value, an unbiased signal power value, an unbiased noise correlation and an unbiased signal correlation according to the biased noise power value, the biased signal power value, the biased noise correlation and the biased signal correlation by using first inverted matrix;

a frequency-domain smoothing module, wherein the frequency-domain smoothing module is stored in non-transitory computer-readable storage media, for frequency-domain smoothing the unbiased noise power value, the unbiased signal power value, the unbiased noise correlation and the unbiased signal correlation;

a time-domain filter module, wherein the time-domain filter module is stored in non-transitory computer readable storage media, for time-domain filtering the frequency-domain smoothed unbiased noise power value, unbiased signal power value, unbiased noise correlation and unbiased signal correlation; and a demodulation circuit, for demodulating the filtered unbiased noise power value, unbiased signal power value, unbiased noise correlation and unbiased signal correlation to restore an original transmission signal;

wherein the channel estimation module performs the channel estimation on at least one signal received by a first reception antenna and a second reception antenna, respectively, to obtain corresponding real channel estimation values $H_{LS}^1$ and $H_{LS}^2$, where $H_{LS}^1$ represents the real channel estimation value corresponding to the first reception antenna, and $H_{LS}^2$ represents the real channel estimation value corresponding to the second reception antenna;

wherein the first and second filter modules filter the real channel estimation values $H_{LS}^1$ and $H_{LS}^2$, respectively, to obtain corresponding filtered channel estimation values $Y_w^1(k)$, $Y_w^2(k)$, $Y_u^1(k)$ and $Y_u^2(k)$, where $Y_w^1(k)$ represents the filtered channel estimation value obtained from filtering $H_{LS}^1$ by the first filter module, $Y_w^2(k)$ represents the filtered channel estimation value obtained from filtering $H_{LS}^2$ by the first filter module, $Y_u^1(k)$ represents the filtered channel estimation value obtained from filtering $H_{LS}^1$ by the second filter module, and $Y_u^2(k)$ represents the filtered channel estimation value obtained from filtering $H_{LS}^2$ by the second filter module; and the first and second filter modules are linearity-unassociated;

wherein values of $H_{LS}^1$ and $H_{LS}^2$ are:

$$H_{LS}^1 = H_{ideal}^1 + v^1 \quad (1)$$

$$H_{LS}^2 = H_{ideal}^2 + v^2 \quad (2)$$

where $H_{ideal}^1$ represents an ideal channel estimation value of the first reception antenna, $v^1$ represents a noise value of the first reception antenna, $H_{ideal}^2$ represents an ideal channel estimation value of the second reception antenna, and $v^2$ represents a noise value of the second reception antenna; and values of $Y_w^1(k)$, $Y_w^2(k)$, $Y_u^1(k)$ are calculated through following equations:

$$Y_w^1(k) = wH_{LS}^1 \quad (3)$$

$$Y_w^2(k) = wH_{LS}^2 \quad (4)$$

$$Y_u^1(k) = uH_{LS}^1 \quad (5)$$

$$Y_u^2(k) = uH_{LS}^2 \quad (6)$$

where w represents a coefficient row vector of the first filter, k represents a $k^{th}$ subcarrier on a frequency domain, and u represents a coefficient row vector of the second filter; and wherein the first calculation modules calculates biased noise power values $S_w^1$ and $S_w^2$, biased signal power values $S_u^1$ and $S_u^2$, a biased noise correlation $P_w^{12}$ between $Y_w^1(k)$ and $Y_w^2(k)$, and a biased signal correlation $P_u^{12}$ between $Y_w^1(k)$ and $Y_w^1(k)$ corresponding to the first reception antenna and the second reception antenna according to $Y_w^1(k)$, $Y_w^1(k)$, $Y_w^1(k)$ and $Y_w^2(k)$, respectively; and values of $S_w^1$, $S_w^2$, $S_u^1$, $S_u^2$, $P_w^{12}$ and $P_u^{12}$ are calculated through following equations:

$$S_w^1 = E_k(Y_w^1(k) \cdot Y_w^1(k)^*) \quad (7)$$

$$S_w^2 = E_k(Y_w^2(k) \cdot Y_w^2(k)^*) \quad (8)$$

$$S_u^1 = E_k(Y_u^1(k) \cdot Y_u^1(k)^*) \quad (9)$$

$$S_u^2 = E_k(Y_u^2(k) \cdot Y_u^2(k)^*) \quad (10)$$

$$P_w^{12} = E_k(Y_w^1(k) \cdot Y_w^2(k)^*) \quad (11)$$

$$P_u^{12} = E_k(Y_u^1(k) \cdot Y_u^2(k)^*) \quad (12)$$

where $S_w^1$ represents the biased noise power value corresponding to the first reception antenna, $S_w^2$ represents the biased noise power value corresponding to the second reception antenna, $S_u^1$ represents the biased signal power value corresponding to the first reception antenna, $S_u^2$ represents the biased signal power value corresponding to the second reception antenna, $P_w^{12}$ represents the biased noise correlation between $Y_w^1(k)$ and $Y_w^1(k)$, $P_u^{12}$ represents the biased signal correlation between $Y_w^1(k)$ and $Y_w^1(k)$, $E_k(\bullet)$ represents a frequency-domain average, and $(\bullet)^*$ represents a conjugation.

5. The channel and noise estimation apparatus according to claim 4, wherein the second calculation modules obtains according to equations (1), (3) and (7) that:

$$S_w^1 = E_k(Y_w^1(k) \cdot Y_w^1(k)^*) = wE[(H_{ideal}^1 + v^1)(H_{ideal}^1 + v^1)^H]w^H \quad (13)$$
$$= w(\alpha_1^2 R_{HH} + \sigma_1^2 I)w^H = \alpha_1^2 w R_{HH} w^H + \sigma_1^2 w w^H;$$

the second calculation module obtains according to equations (1), (5) and (9) that:

$$S_u^1 = E_k(Y_u^1(k) \cdot Y_u^1(k)^*) = uE[(H_{ideal}^1 + v^1)(H_{ideal}^1 + v^1)^H]u^H \quad (14)$$
$$= u(\alpha_1^2 R_{HH} + \sigma_1^2 I)u^H = \alpha_1^2 u R_{HH} u^H + \sigma_1^2 u u^H;$$

by establishing a simultaneous equation from equations (13) and (14), the second calculation module obtains that:

$$\begin{pmatrix} S_w^1 \\ S_u^1 \end{pmatrix} = \begin{pmatrix} wR_{HH}w^H & ww^H \\ uR_{HH}u^H & uu^H \end{pmatrix} \begin{pmatrix} \alpha_1^2 \\ \sigma_1^2 \end{pmatrix}; \quad (15)$$

by inverting the matrix $$\begin{pmatrix} wR_{HH}w^H & ww^H \\ uR_{HH}u^H & uu^H \end{pmatrix}$$

in equation (15), according to the biased noise power value $S_w^1$ corresponding to the first reception antenna and the biased signal power value $S_u^1$ corresponding to the first reception antenna, the second calculation module obtains that:

$$\begin{pmatrix} \alpha_1^2 \\ \sigma_1^2 \end{pmatrix} = \begin{pmatrix} wR_{HH}w^H & ww^H \\ uR_{HH}u^H & uu^H \end{pmatrix}^{-1} \begin{pmatrix} S_w^1 \\ S_u^1 \end{pmatrix}; \qquad (16)$$

where $E(\bullet)$ represents an average, $(\bullet)^H$ represents a conjugate transpose, I represents a unit matrix, $R_{HH}$ represents a correlation matrix of $H_{LS}^1$ and $H_{LS}^2$ on the subcarriers, $\alpha_1^2$ the unbiased signal power value corresponding to the first reception antenna, and $\sigma_1^2$ represents the unbiased noise power value corresponding to the first reception antenna;

the second calculation module further obtains an unbiased signal power value $\alpha_2^2$ corresponding to the second reception antenna and an unbiased noise power value $\sigma_2^2$ corresponding to the second reception antenna;

the second calculation module obtains according to equations (1), (2), (3), (4) and (11) that:

$$P_w^{12} = E_k(Y_w^1(k) \cdot Y_w^2(k)^*) = wE[(H_{ideal}^1 + v^1)(H_{ideal}^2 + v^2)^H]w^H \qquad (17)$$
$$= w(\beta_{12}R_{HH} + \gamma_{12}I)w^H = \beta_{12}wR_{HH}w^H + \gamma_{12}ww^H;$$

the second calculation module obtains according to equations (1), (2), (5), (6) and (12) that:

$$P_u^{12} = E_k(Y_u^1(k) \cdot Y_u^2(k)^*) = uE[(H_{ideal}^1 + v^1)(H_{ideal}^2 + v^2)^H]u^H \qquad (18)$$
$$= u(\beta_{12}R_{HH} + \gamma_{12}I)u^H = \beta_{12}uR_{HH}u^H + \gamma_{12}uu^H;$$

by establishing a simultaneous equation from equations (17) and (18), the second calculation module obtains that:

$$\begin{pmatrix} P_w^{12} \\ P_u^{12} \end{pmatrix} = \begin{pmatrix} wR_{HH}w^H & ww^H \\ uR_{HH}u^H & uu^H \end{pmatrix} \begin{pmatrix} \beta_{12} \\ \gamma_{12} \end{pmatrix}; \qquad (19)$$

and by inverting the matrix $$\begin{pmatrix} wR_{HH}w^H & ww^H \\ uR_{HH}u^H & uu^H \end{pmatrix}$$

in equation (19), according to the biased noise correlation $P_w^{12}$ and the biased signal correlation $P_u^{12}$, the second calculation module obtains that:

$$\begin{pmatrix} \beta_{12} \\ \gamma_{12} \end{pmatrix} = \begin{pmatrix} wR_{HH}w^H & ww^H \\ uR_{HH}u^H & uu^H \end{pmatrix}^{-1} \begin{pmatrix} P_w^{12} \\ P_u^{12} \end{pmatrix}; \qquad (20)$$

where $\beta_{12}$ represents the unbiased signal correlation between $Y_u^1(k)$ and $Y_u^2(k)$, and $\gamma_{12}$ represents the unbiased noise correlation between $Y_w^1(k)$ and $Y_w^2(k)$.

\* \* \* \* \*